April 13, 1971    R. J. NICKERSON ET AL    3,574,561
OXYGEN GENERATOR SYSTEM UTILIZING ALKALI
METAL PEROXIDES AND SUPEROXIDES
Filed July 24, 1969    2 Sheets-Sheet 1
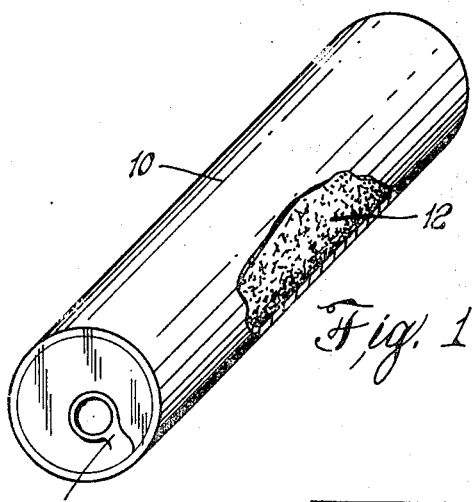
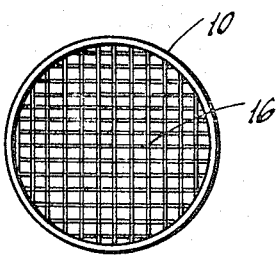
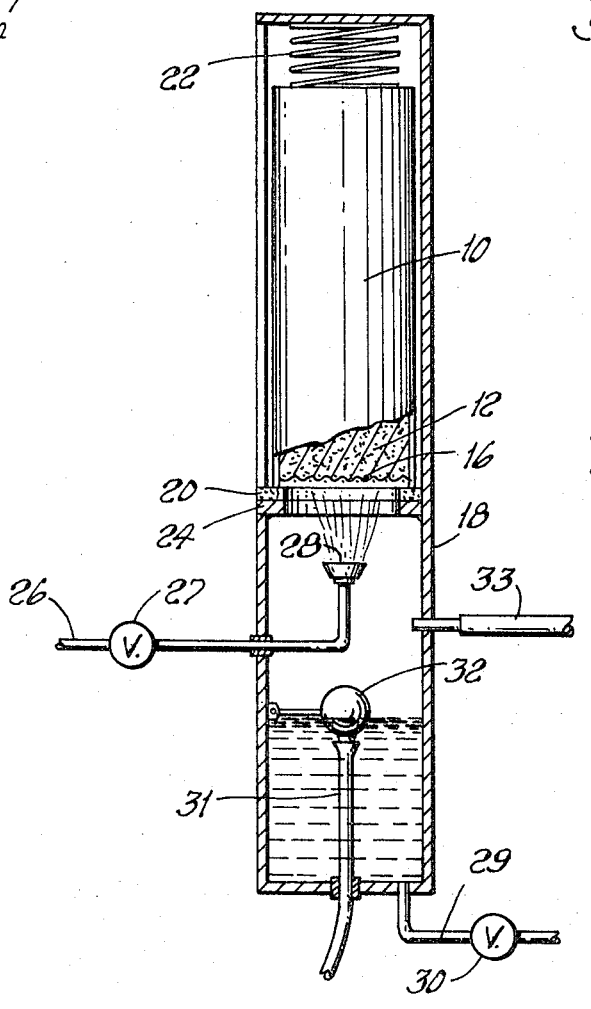
INVENTORS.
RUSSELL J. NICKERSON
THOMAS V. BOLLES
BY
AGENT
ATTORNEY United States Patent Office 3,574,561
Patented Apr. 13, 1971

3,574,561
OXYGEN GENERATOR SYSTEM UTILIZING ALKALI METAL PEROXIDES AND SUPEROXIDES
Russell J. Nickerson, Mystic, Conn., and Thomas V. Bolles, Wellesley, Mass., assignors to the United States of America as represented by the Secretary of the Navy
Filed July 24, 1969, Ser. No. 844,527
Int. Cl. C01b 13/02; B01j 7/02
U.S. Cl. 23—282
4 Claims

ABSTRACT OF THE DISCLOSURE

Oxygen is obtained by watering an alkali metal peroxide or superoxide, singly or as a mixture of materials, by spraying water upward onto the chemical contained in a downwardly directed elongated cartridge and providing for gravity escape of the sprayed water plus hydroxide product, thus affording control over the rate of reaction and by funneling the released oxygen to a delivery tube.

Figure 4:
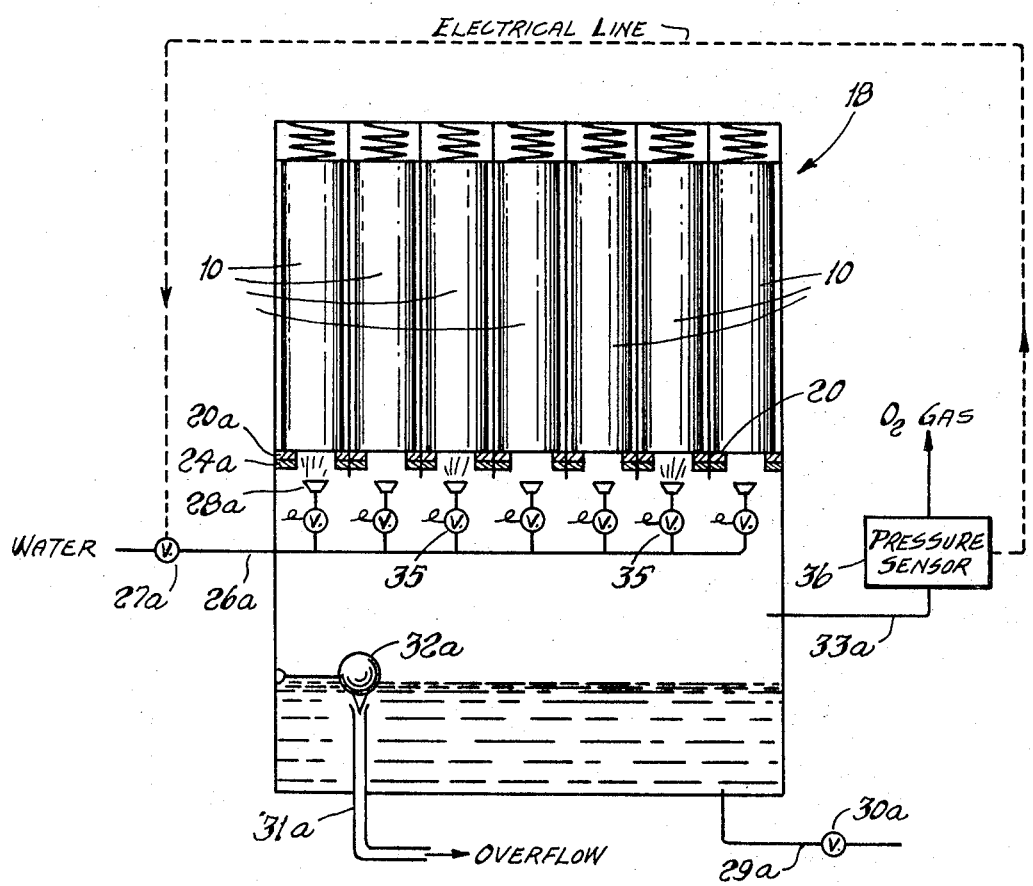

This invention relates to improved techniques for releasing oxygen at a controllable rate by wetting alkali metal peroxide or superoxide with water, efficiently, conveniently, at a rate needed and initiated and terminated as required.

BACKGROUND OF THE INVENTION

Peroxide and superoxide chemicals have been used as oxygen sources. Methods for releasing the oxygen have included introducing the chemical into a water containing reactor, but the methods have been complex, insufficiently flexible, and unreliable. The chemical needed to be loaded in a manner making necessary free access to the reactor, the reactor required moving parts, and cleaning problems were substantial. These disadvantages are overcome by this invention, as will become apparent from the following detailed description of the invention when considered in conjunction with the accompanying drawings.

THE DRAWINGS

FIG. 1 is a perspective view of a novel cartridge of the active material in accordance with this invention;
FIG. 2 is an end view of the cartridge in FIG. 1;
FIG. 3 is a housing fixture for nesting a cartridge as in FIG. 1 for use in releasing oxygen; and
FIG. 4 is a housing fixture for nesting several cartridges.

DETAILED DESCRIPTION

The cartridge shown in FIG. 1 is filled with granular or compacted high density alkali metal peroxide, superoxide, or a mixture of such chemicals 12 and is sealed hermetically against deterioration. At one end, the cartridge is formed with a manually tearable cover 14 having a finger grip which may be similar to those used on cans or alternately, tearable foil or other sheet material for exposing the chemical. Beneath the covering is a screen 16 or a perforate member of non-reactive material for confining the material in the cartridge against dropout when the cartridge is oriented with the opened end downward. The screen 16 also limits the force of a water jet or spray directed against the chemical.

In FIG. 3 the cartridge 10 is shown loaded in a one cartridge reactor 18. The cartridge sits on a gasket 20. A spring 22 at the upper end of the reactor is compressed by the cartridge when loaded in place for urging the opened end of the cartridge in gas tight relationship with the gasket 20. The gasket 20 sits on a flange 24. The upper part of the reactor may have a hinged side or an open side as shown to provide easy access for loading and removing a cartridge.

Water supply plumbing 26 having a manually controllable valve 27 is located exterior of the reactor and extends in a gas tight manner into the lower part of the reactor and terminates in a sprinkler, spray, or straight jet head 28. An exhaust tube 29, having a manually controllable valve 30, and an overflow tube 31 large enough to drain as rapidly as water is supplied extend in a gas tight manner into the lower part of the reactor. Tube 31 is opened and closed by a gravity operated float valve 32. A gas exhaust tube 33 is provided for extracting the released oxygen.

To operate, the valve 30 may or may not be opened; the valve 27 is opened to the degree desired to direct water to the open end of the cartridge 10. The chemical readily reacts with the water releasing oxygen and forming a hydroxide solution which flows into the bottom of the reactor. Water and hydroxide flows down to the bottom of the reactor and out through tube 29, if valve 30 is open. The float valve 32 normally closes the overflow tube against escape of released oxygen. If the fluid rises substantially above the level of the overflow tube 31, the float 32 is buoyed up permitting the fluid to overflow. Oxygen does not escape through the overflow because fluid covers the open end of tube 31 when the float uncovers the tube end. Gasket 20 prevents escape of oxygen through the upper end of the reactor. The rate of oxygen production can be controlled by adjusting the rate of water flow. The hydroxide solution can be drawn off through valve 30 for scrubbing carbon dioxide from the atmosphere in an adjoining system, not shown, to aid in revitalizing the same atmosphere to which oxygen is added. Alternatively, the caustic solution from the reactor may be recycled back to the spray nozzle instead of using continuous fresh water feed. In the cartridge, the active material moves downwardly as it is consumed. For a high rate of oxygen generation for a relatively short time, the chemical is granular and loosely packed.

In FIG. 4 there is shown a reactor 18a for accommodating a plurality of cartridges 10. Any selected number of the cartridges are loaded into the reactor with the bottom opening of each over a spray nozzle 28a. Pressure is applied mechanically to the top of each cartridge to form a seal between the end of the cartridge and the gasket 20a. An electrically controllable isolation valve 35 is provided for each spray head. Any one or any plurality of the valves 35 can be actuated at one time. Solenoid controlled isolation gates may be provided to seal off individual cartridge chambers from the reactor to prevent escape of oxygen during removal and replacement of a cartridge if no loss of oxygen can be tolerated. Water is delivered through the nozzles, one at a time or in various combinations, provided valve 27a is open. A pressure sensor 36 may be connected to the tube 33a to sense the rate of oxygen flow. The pressure sensor is electrical and may include a crystal, or bellows, or diaphragm etc. for delivering an electrical output to a relay to control valve 27a to adjust rate of water flow for constant rate of output of oxygen. By staggering the activation of cartridges, oxygen flow can be continuous notwithstanding exhaustion of cartridges and replacement of exhausted cartridges.

We claim:
1. An oxygen generator comprising
a reactor including a nesting space for an elongated cartridge,
a gasket seal surrounding an opening in the reactor at one end of the cartridge space in the reactor,
a force applying means at the other end of the cartridge nesting space in the reactor,
an oxygen generating space provided in the reactor in a position below said cartridge nesting space and communicating with the gasket seal opening, a water supply nozzle means supported in the oxygen generating space and directed toward the gasket seal opening, said nozzle means, when actuated, functioning to impinge a stream of water against a cartridge located in said cartridge nesting space, valve controlled water supply plumbing means outside the reactor and extending into the oxygen generating space in sealed relationship with the reactor and joined to the water supply nozzle means, float-controlled liquid exhaust plumbing extending from the oxygen generating space to the exterior of the reactor and operable to respond to liquid level in the oxygen generating space, and an oxygen delivery tube extending from inside the oxygen generating space to the exterior of the reactor.

2. An oxygen generator as defined in claim 1 including a flow sensor in the oxygen delivery tube and operatively connected to the valve controlled water supply plumbing to regulate the water flow rate to said water supply nozzle means wherein a constant oxygen flow is maintained.

3. An oxygen generator as defined in claim 2 wherein said reactor includes a plurality of cartridge nesting spaces, a gasket seal opening, a force applying means, a water supply nozzle means and an electrically controllable isolation valve for each cartridge nesting space.

4. An oxygen generator as defined in claim 3 including a cartridge containing a solid state chemical that releases oxygen and hydroxide solution when wetted by water, supported in at least one of said cartridge nesting spaces, the cartridge end against the seal confining the solid state chemical against outflow but exposing the chemical to wetting by water directed thereagainst for releasing oxygen and progressively dissolving said solid state chemical.

References Cited

UNITED STATES PATENTS

| | | | |
|---|---|---|---|
| 691,058 | 1/1902 | Jaubert | 23—221 |
| 705,570 | 7/1902 | Feldkamp | 23—282 |
| 788,256 | 4/1905 | Foersterling et al. | 23—221 |
| 2,455,975 | 12/1948 | Buehl et al. | 23—282 |
| 2,463,863 | 3/1949 | Gibaldo | 23—282 |
| 2,721,788 | 10/1955 | Schad | 23—281 |
| 3,089,508 | 5/1963 | Schulze et al. | 23—267(.5)X |
| 3,372,996 | 3/1968 | Barrett et al. | 23—282 |
| 3,507,624 | 4/1970 | Schneider et al. | 23—267(.5)X |

MORRIS O. WOLK, Primary Examiner

B. S. RICHMAN, Assistant Examiner

U.S. Cl. X.R.

23—221, 267